United States Patent [19]

Nakayama et al.

[11] Patent Number: 5,188,488

[45] Date of Patent: Feb. 23, 1993

[54] END MILL

[75] Inventors: Masaaki Nakayama; Masayuki Okawa; Keiichi Nishiyama, all of Tokyo, Japan

[73] Assignee: Mitsubishi Materials Corporation, Tokyo, Japan

[21] Appl. No.: 911,810

[22] Filed: Jul. 10, 1992

Related U.S. Application Data

[63] Continuation of Ser. No. 697,969, May 10, 1991, abandoned.

[30] Foreign Application Priority Data

May 11, 1990 [JP] Japan .................. 2-49489[U]
May 11, 1990 [JP] Japan .................. 2-49490[U]

[51] Int. Cl.$^5$ ............................. B23C 5/10
[52] U.S. Cl. ........................... 407/54; 407/57; 407/63
[58] Field of Search .............. 407/34, 42, 51, 53, 407/54, 56, 58, 59, 63, 57

[56] References Cited

U.S. PATENT DOCUMENTS

| | | | |
|---|---|---|---|
| 2,889,669 | 6/1959 | Babbitt | 407/53 |
| 2,940,342 | 6/1960 | Lavallee. | |
| 3,078,546 | 2/1963 | Kiernan | 407/53 |
| 3,217,382 | 11/1965 | De Dobbelaere et al. | 407/53 |
| 3,548,476 | 12/1970 | Cave et al. | 407/54 |
| 4,174,915 | 11/1979 | Peetz et al. | 407/59 |
| 4,285,618 | 8/1981 | Shanley, Jr. | 407/57 |
| 4,411,563 | 10/1983 | Moon | 407/54 |
| 4,560,308 | 12/1985 | Deller | 407/53 |
| 4,572,714 | 2/1986 | Suzuki et al. | 407/53 |
| 4,893,968 | 1/1990 | Levy | 407/54 |
| 4,990,035 | 2/1991 | Scheuch et al. | 407/59 X |
| 5,026,227 | 6/1991 | Nishi et al. | 407/54 |

FOREIGN PATENT DOCUMENTS

| | | | |
|---|---|---|---|
| 685523 | 4/1964 | Canada | 407/54 |
| 2235690 | 1/1974 | Fed. Rep. of Germany. | |
| 2533079 | 8/1976 | Fed. Rep. of Germany. | |
| 3623175 | 1/1988 | Fed. Rep. of Germany | 407/53 |
| 8803812 | 10/1988 | Fed. Rep. of Germany. | |
| 897062 | 3/1945 | France. | |
| 2516830 | 5/1983 | France. | |
| 63-161615 | 10/1988 | Japan. | |
| 321108 | 12/1989 | Japan | 407/53 |
| 631271 | 11/1978 | U.S.S.R. | 407/54 |
| 1183307 | 10/1985 | U.S.S.R. | 407/53 |
| 612288 | 11/1948 | United Kingdom. | |
| 1404492 | 8/1975 | United Kingdom | 407/53 |

OTHER PUBLICATIONS

Patent Abstracts of Japan, vol. 8, No. 152, (M-309) 1589, Jul. 1984; JP/A/59 47 119, Mar. 1984.

*Primary Examiner*—Steven C. Bishop
*Attorney, Agent, or Firm*—Cushman, Darby & Cushman

[57] ABSTRACT

An end mill is disclosed which includes a tool body having a shaft-like shape. The tool body has a cutting edge portion formed at one end thereof. The cutting edge portion has a plurality of circumferential cutting edges formed on the circumference thereof along the longitudinal axis of the tool body. The end mill is characterized in that the cutting edge portion has the circumferential surface thereof which includes rake faces and flanks. Each of the rake faces adjoins one of two adjacent circumferential cutting edges. Each of the flanks intersects with one of the rake faces at one end and adjoins the other of the two adjacent circumferential cutting edges at the other end. The rake faces have a rake angle arranged between a range of 5° to −45° at a cross section perpendicular to the axis of the tool body. The flanks have a relief angle arranged between a range of 20° to 45° at a cross section perpendicular to the axis of the tool body. In one embodiment, the circumferential surface of the cutting edge portion is formed of an alternately connected plurality of concave surfaces receding inwardly toward the center of the cutting edge portion, with different ranges of rake and relief angles.

10 Claims, 9 Drawing Sheets

END MILL

This is a continuation of application Ser. No. 07/697,969, filed on May 10, 1991, now abandoned.

BACKGROUND OF THE INVENTION

The present invention relates to an end mill having high rigidity and suitable for precision-cutting deep grooves into precision parts such as dies.

Certain conventional end mills have been developed to meet the requirements of having high rigidity and being capable of precision cutting, e.g. deep groove cutting.

Those conventional end mills for deep groove cutting have advantageous designs in which relatively small-sized grooves are required for discharging chips because only a small amount of chip material is generated due to the depth of cut being set to an extremely small dimension. Such depth of cut could be as small as 0.004 mm in the direction normal to the slope of a tapered groove in the case of a tapered groove having a taper angle of 5°, which is equivalent to 0.1 mm in the direction of the groove depth.

While having such advantage in design, those conventional deep groove cutting end mills, however, must meet the requirement of extremely high rigidity because the cutting edge portion thereof is made more slender than ordinary end mills due to the characteristics of deep groove cutting.

FIGS. 19 through 22 show a typical conventional tapered end mill arranged in consideration of the above characteristics. This end mill is disclosed in Japanese Utility Model Unexamined Publication (Jitsu-Kai) No. SHO-63-161615.

The tapered end mill shown in FIGS. 19 through 22 comprises a right cylindrical column-shaped tool body 10 having tapered cutting edge portion 12 integrally formed at one end of the tool body 10 so that the diameter thereof decreases toward the one end of the tool body 10. On the circumference of the cutting edge portion 12 are a plurality of spiral circumferential cutting edges 20 formed so that a conical rotary locus "R" is formed around the axis of the tool body. The cutting edge portion 12 further has end cutting edges 22 formed at the end thereof. The cutting edge portion 12 has a cross section formed in the shape of a regular polygon, such as the regular hexagon shown in FIG. 21, or the regular triangle shown in FIG. 22, in which a line formed by intersecting adjacent sides 24 forms the circumferential cutting edge 20. A respective overall length of each of the circumferential cutting edges 20 is arranged to be at least six times the rotational diameter at the one end of the circumferential cutting edges 20.

As shown in FIGS. 23 and 24, certain straight end mills having the cutting edge portion formed in a right cylindrical column shape around the axis of the tool body have exactly the same cross section as shown in FIG. 21. Such straight end mills are also used for cutting high hardness material in addition to the deep groove cutting mentioned above.

Those conventional deep groove cutting end mills are able to conduct stable cutting while avoiding chatter during the deep groove cutting because of the possession of higher rigidity than end mills for conventional use; this is due to the large cross sectional area resulting from the lack of chip discharging grooves on the circumference of the tool and also to a large included angle $\theta$ of the circumferential cutting edge 20.

As described above, the conventional deep groove cutting end mills have the cross section of the cutting edge portion 12 thereof formed in a regular polygonal shape. This means that the rake angle $\gamma$ of the circumferential cutting edge 20 at a cross section perpendicular to the axis (hereinafter referred to as the "rake angle") is determined by the cross sectional shape of the cutting edge portion 12 resulting in an angle greatly deviated to the negative side, such as $-60°$ for the cutting edge portion 12 having a cross section of a regular hexagon, $-45°$ for a cross section of a square, and $-30°$ for a cross section of a triangle, in which the number of the circumferential cutting edges is minimal, as shown in FIG. 22. Because of this, the conventional deep groove cutting end mills have a disadvantage in that cutting resistance is increased, thereby tending to decrease the cutting sharpness.

It is understood that the greater the number of corners of the cutting edge portion 12, or the greater the number of edges of the circumferential cutting edges 20, the greater the feed of the tool per revolution can be, which is useful for improving cutting efficiency. A larger number of corners can be also effective for improving tool rigidity because of the increase in the tool's cross sectional area. However, the maximum possible number of corners is practically limited to six (hexagonal cross section) because cutting resistance increases due to the rake angle $\gamma$ being more deviated to the negative side as the number of edges of circumferential cutting edges 20 increases. Therefore, it was not possible to improve cutting efficiency simply by increasing the number of edges.

Furthermore, the conventional deep groove cutting end mills have another disadvantage in that an optimal relief angle $\alpha$ can not be determined in accordance with cutting requirements because the relief angle $\alpha$ of the circumferential cutting edge 20 at a cross section perpendicular to the axis (hereinafter referred to as the "relief angle") is determined by the number of corners of the cutting edge portion 12, whereby the relief angle is 30° for a hexagon, 45° for a square, and 60° for a triangle.

SUMMARY OF THE INVENTION

Therefore, an object of the present invention is to provide an end mill that can reduce cutting resistance while maintaining tool rigidity, thereby enabling the conduct of machine cutting at higher efficiency than conventional deep groove cutting end mills of the prior art.

According to the present invention, there is provided a first end mill comprising a tool body having a shaft-like shape, the tool body having a cutting edge portion formed on one end thereof, the cutting edge portion having a plurality of circumferential cutting edges formed on the circumference thereof along the longitudinal axis of the tool body. The end mill is characterized in that the cutting edge portion has the circumferential surface thereof comprising rake faces and flanks, each of the rake faces adjoining one of two adjacent circumferential cutting edges, each of the flanks intersecting one of the rake faces at one end and adjoining the other of the two adjacent circumferential cutting edges at the other end, the rake faces having a rake angle arranged between a range of 5° to $-45°$ at a cross section perpendicular to the axis of the tool body, the flanks having a relief angle arranged between a range of 20° to 45° at a cross section perpendicular to the axis of the tool body.

Furthermore, according to the present invention, there is provided a second end mill comprising a tool body having a shaft-like shape, said tool body having a cutting edge portion formed on one end thereof, said cutting edge portion having a plurality of circumferential cutting edges formed on the circumference thereof along the longitudinal axis of said tool body. The second end mill is characterized in that the cutting edge portion has the circumferential surface thereof comprising concave surfaces receding inwardly toward the centerline of the cutting edge portion and convex surfaces projecting outwardly radially of the cutting edge portion, each of the concave surfaces and each of the convex surfaces being alternately arranged with each other circumferentially on a cross section perpendicular to the axis of the tool body, each of the convex surfaces having one end thereof meeting the rotary circle of the rotary locus on the cross section perpendicular to the axis of the tool body, the rotary locus formed by the circumferential cutting edges, each of the convex surfaces having a curvature gradually growing larger from the one end toward the other end of the convex surface, each of the convex surfaces then receding toward the centerline of the cutting edge portion, whereby the one end of each of the convex surfaces intersecting one adjacent concave surface of the concave surfaces forms the circumferential cutting edge, each of the concave surfaces forming a rake face, each of the convex surfaces forming a flank.

The present invention is understood to be applicable to both straight end mills, wherein the circumferential cutting edges are arranged to form a rotary locus of right cylindrical column shape around the axis of the tool body, and tapered end mills, wherein the circumferential cutting edges form a rotary locus of truncated conical shape around the axis of the tool body.

Thus, in the end mills of the present invention, rake angles and relief angles can be varied, without restriction by the number of edges of the circumferential cutting edges, either by means of individually adjusting the inclination of rake faces and flanks forming the circumferential surface of the cutting edge portion in the first end mill of the present invention, or by means of changing the parameters of configuration, such as curvatures and positions for the center of curvature, of the concave and convex surfaces forming the circumferential surface of the cutting edge portion in the second end mill of the present invention.

Therefore, in the end mills of the present invention, the cutting sharpness can be improved by changing the rake angle of the rake faces more toward the positive angles than conventional deep groove cutting end mills. In addition, by appropriately adjusting the relief angle of the flanks together with the adjustment of rake angles described above, an excessive decrease in the cross sections of the tool body and the included angles can be avoided, thereby restricting the deterioration of tool rigidity. Subsequently, high efficiency cutting can be performed by increasing the number of the circumferential cutting edges while maintaining tool rigidity and cutting sharpness.

DESCRIPTION OF THE PREFERRED EMBODIMENTS OF THE INVENTION

Figure 1:
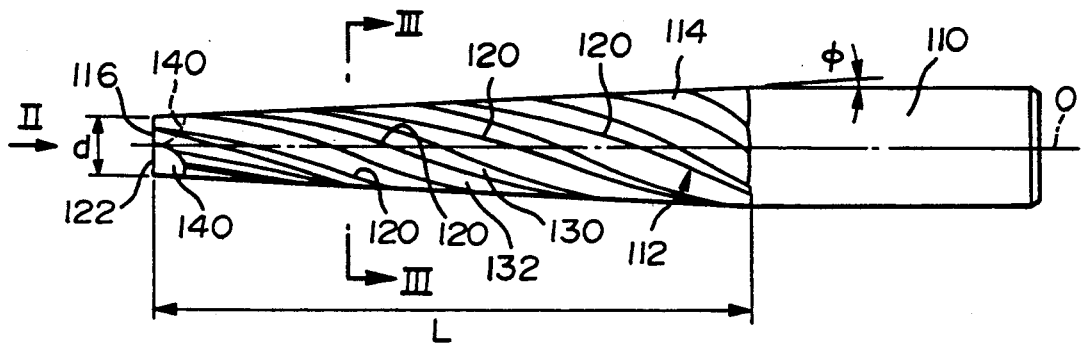
FIG. 1 is a plan view of an end mill in accordance with a first embodiment of the present invention.
Figure 2:
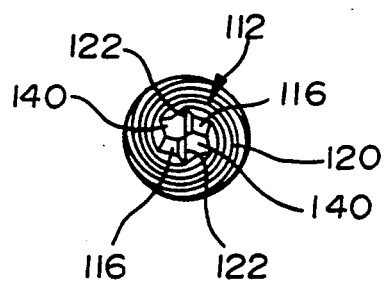
FIG. 2 is an end view of the end mill of FIG. 1 seen in the direction indicated by the arrow II in FIG. 1.
Figure 3:
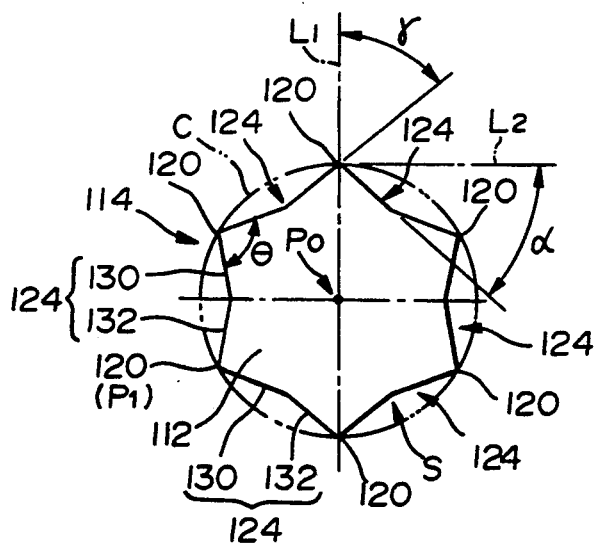
FIG. 3 is a cross-sectional view of the end mill of FIG. 1 taken along the line III—III in FIG. 1.

FIGS. 1 to 3 depict an end mill in accordance with a first embodiment of the present invention. As shown in FIGS. 1 to 3, the end mill of the first embodiment comprises a tool body 110 having a shaft-like shape, the tool body 110 having a cutting edge portion 112 formed at one end thereof. The cutting edge portion 112 has a tapered shape in the first embodiment shown in FIG. 1, having the diameter thereof decreased toward the one end of the tool body 110. On the circumference of the cutting edge portion 112 are a plurality of spiral circumferential cutting edges 120 formed on the circumference thereof around the longitudinal axis "O" of the tool body 110 so that a phantom conical rotary locus "C" is formed around the axis "O" of the tool body. The cutting edge portion 112 further has end cutting edges 122 formed at the front end thereof.

As shown in FIGS. 1 to 3, the circumferential surface 114 comprises six sides 124 receding inwardly toward the center $P_0$ of the cross section of the tool body. Those sides 124 are circumferentially equally spaced with each other around the center $P_0$, thereby forming a star-shaped cross section as a whole.

Each of the sides 124 of the cutting edge portion 112 comprises a rake face 130 and a flank 132, the rake face 130 and the flank 132 intersecting each other substantially at the center of the lateral length of the side 124 in the cross section of the circumferential cutting edge portion 112 as shown in FIG. 3, thereby having the side 124 formed substantially V-shaped in cross section. These rake faces 130 and flanks 132 are respectively formed in a spiral surface gradually spiraling clockwise around the axis "O" of the tool body from the one end (front end) of the cutting edge portion 112, where the end cutting edges 122 are formed, toward the other end (rear end) of the cutting edge portion 112. Each of the rake faces 130 adjacent to the flank 132 of an adjacent side 124 has an intersecting point $P_1$ with the adjacent flank 132 of the adjacent side 124 in the cross section as shown in FIG. 3, whereby the intersecting point $P_1$ is inscribed to or meets the phantom conical rotary locus "C" and forms the circumferential cutting edge 120 described above.

The rake angle $\gamma$ of the rake faces 130 described above with respect to the circumferential cutting edge 120 of the first embodiment is advantageously arranged between a range of 5° to −45°, though the rake angle $\gamma$ of the rake faces 130 may be appropriately set in accordance with parameters such as the material of the work to be cut and the cutting requirements. Such arrangement is made because if the rake angle $\gamma$ exceeds 5°, the tool rigidity would tend to decrease due to an insufficient included angle $\theta$ of the circumferential cutting edges 120 and because if the rake angle $\gamma$ is below −45°, the cutting sharpness would tend to decrease due to an excessive increase in the cutting resistance to the circumferential cutting edges 120. The rake angle $\gamma$ herein means an angle between a line $L_1$, which is drawn through the circumferential cutting edge 120 and the center $P_0$ of the cross section of the tool body, and the rake face 130, as shown in FIG. 3. The angle is taken to be of a positive value if the direction of the rake face is obtained by turning the line $L_1$ counterclockwise by the absolute value of the rake angle (however, $-90° < \gamma < 90°$). The first embodiment in FIG. 3 is shown to have a rake angle of −45 degrees.

The relief angle $\alpha$ of the flank 132 described above is advantageously arranged between a range of 20° to 45°, though the relief angle $\alpha$ of the flank 132 may be appropriately set, like the rake angle $\gamma$ described above, in accordance with parameters such as the material of the work to be cut. Such arrangement is made because if the relief angle $\alpha$ is less than 20°, the circumferential cutting edges 120 would tend to wear out prematurely and because if the relief angle $\alpha$ is more than 45°, the tool rigidity would tend to decrease due to an insufficient included angle $\theta$ of the circumferential cutting edges 120. The relief angle $\alpha$ herein means an angle between a tangential line $L_2$, which is drawn tangential to the phantom conical surface described above through the circumferential cutting edge 120, and the flank 132, as shown in FIG. 3. The present embodiment in FIG. 3 is shown to have a relief angle of 45 degrees.

Furthermore, two grooves 140 are formed at the front end of the cutting edge portion 112 of the first embodiment, each of which is open to both the front end surface 116 and the circumferential surface 114 of the cutting edge portion 112, whereby an intersecting ridge, or the end cutting edge 122, is formed between the wall of each of the grooves 140 and the front end surface 116 respectively.

The axial length L and the taper angle $\phi$ of the cutting edge portion 112 may be determined in accordance with the configuration of a groove to be cut. The value of an axial length L is usually set to be at least six times the rotational diameter "d" at the front end of the circumferential cutting edge 120. The value of a taper angle $\phi$ of the cutting edge portion 112 is usually set to be 5 degrees.

Subsequently, a tapered end mill of the first embodiment formed in accordance with the above description has a rake angle $\gamma$ shifted toward the positive angle region, compared with conventional six-edge tapered end mills described above, whereby the cutting resistance of the circumferential cutting edges 120 is reduced and the cutting sharpness is improved. In addition, the tapered end mill of the first embodiment maintains an ample rigidity compared with a cutting tool having large chip-discharging grooves like an ordinary conventional end mill because the cross section of the cutting edge portion 112 decreases by only a small amount from the cross section of a comparable conventional deep groove cutting tapered end mills, the small amount of decrease in cross section being caused by the sides 124 receding inwardly toward the center of the tool body.

Figure 4:
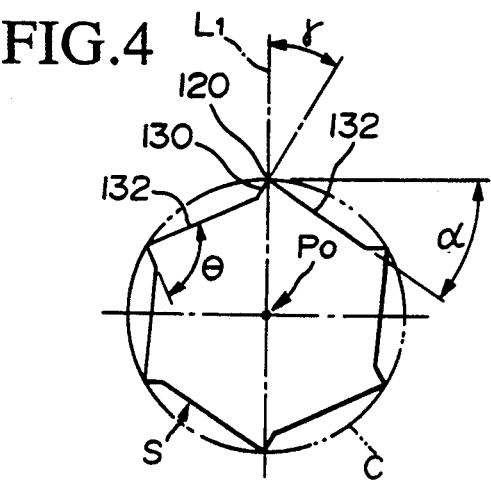
FIG. 4 is a cross sectional view of a variation of the end mill of FIG. 1.
Figure 5:
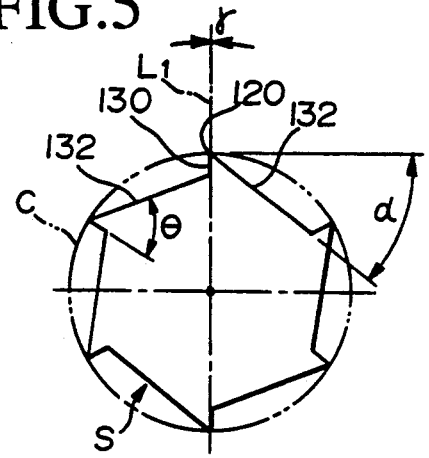
FIG. 5 is a cross sectional view of a variation of the end mill of FIG. 1.
Figure 6:
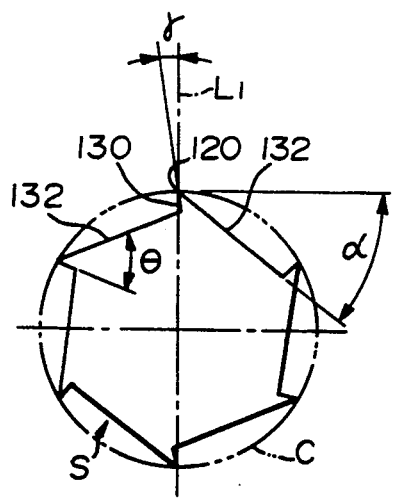
FIG. 6 is a cross sectional view of a variation of the end mill of FIG. 1.
Figure 7:
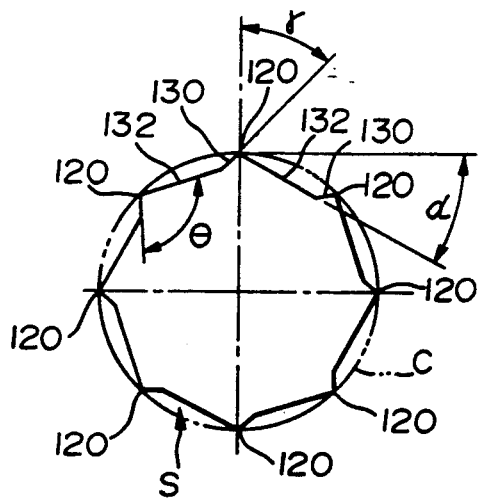
FIG. 7 is a cross sectional view of a variation of the end mill of FIG. 1.

Since the circumferential surface of the cutting edge portion 112 of the end mill of the first embodiment comprises the mutually intersecting rake faces 130 and flanks 132 as described above, the rake angle $\gamma$ may be shifted toward the positive angle region by turning the rake face 130 closer to the line $L_1$ drawn through the circumferential cutting edge 120 and the center $P_0$ of the cross section of the tool in the cross section perpendicular to the axis of the tool body as shown in FIG. 4. The rake angle $\gamma$ may also be shifted to be 0 (zero) degrees by turning the rake face 130 to coincide with the line $L_1$ as shown in FIG. 5, or may further be shifted to be a positive angle by turning the rake face 130 beyond the line $L_1$ as shown in FIG. 6. Thus, the inclination of the rake face may be varied so that an optimal rake angle $\gamma$ is arranged in accordance with parameters such as the material of the work to be cut and the cutting requirements, without restriction by the number of edges of the circumferential cutting edges 120 as previously described. Also, the relief angle $\alpha$ may be varied to an appropriate value by adjusting the inclination of the flank 132. For example, when the rake angle $\gamma$ is shifted toward the positive angle region, the relief angle $\alpha$ may be decreased to maintain the included angle to a constant value so that decrease in the edge strength is avoided.

Furthermore, since the rake angle and relief angle of the first embodiment can be varied without restriction by the number of edges of the circumferential cutting edges 120, the number of edges of the circumferential cutting edges 120 may be increased without decreasing the cutting sharpness so that, for example, the number of edges of the circumferential cutting edges 120 may be increased from 6 to 8 while maintaining the rake angle $\gamma$ and the relief angle $\alpha$ at the same values of the angles for a case where the number of edges is 6. In this case, distinctive advantage is secured in that the cross section of the cutting edge portion 112 can be increased for higher rigidity, and the feed of the cutting tool can be increased for higher cutting efficiency.

In addition, since the cutting edge portion 112 of the first embodiment has substantially V-shaped spaces "S" formed on the circumferential surface of the cutting edge portion 112 in accordance with the inclination of the rake faces 130 and the flanks 132, chips can be smoothly discharged even when the amount of chips generated by cutting is increased due to the increase in the feed of the cutting tool.

Figure 8:
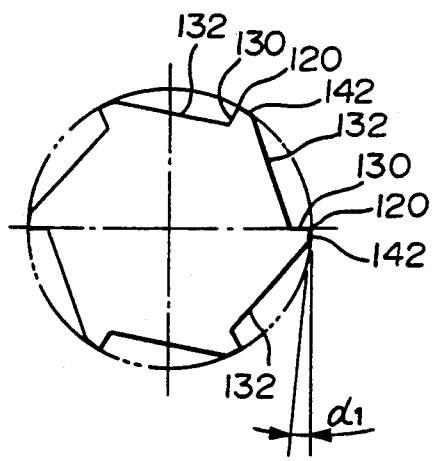
FIG. 8 is a cross sectional view of a variation of the end mill of FIG. 1.

Although the first embodiment is described above with reference to FIGS. 1 to 7 with the flanks 132 having a constant relief angle $\alpha$ all the way from the circumferential cutting edge 120 to the intersection with the rake face 130, it should be understood that the present inventin is not limited to such description. As a variation of the first embodiment, for example, an edge reinforcing surface 18 having a relief angle $\alpha_1$, which is smaller than the relief angle 132 of the flanks, may be formed at each of intersections of the circumferential cutting edges 120 and the flanks 132, as shown in FIG. 8. In this case, the edge strength is increased due to an increase in the thickness of the portion behind the circumferential cutting edge 120, resulting in higher cutting efficiency due to the resulting higher rigidity of the cutting tool.

Figure 9:
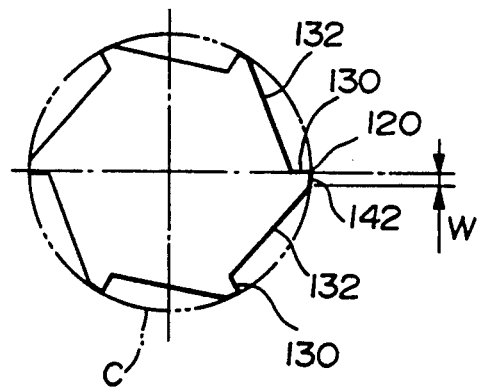
FIG. 9 is a cross sectional view of a variation of the end mill of FIG. 1.

As a variation of the case described above, the edge reinforcing surface 18 may be formed into a convex form having a narrow width "W", as shown in FIG. 9, conforming to the rotary locus, or phantom conical surface formed by said circumferential cutting edges 120 around said axis of said tool body as described previously. In this case, the edge reinforcing surface 18 may be arranged to contact the machined surface of the work for restricting the deflection of the circumferential cutting edge 120, whereby a distinctive advantage is secured in that the cutting accuracy is improved in addition to the improvement of the cutting edge strength.

Figure 10:
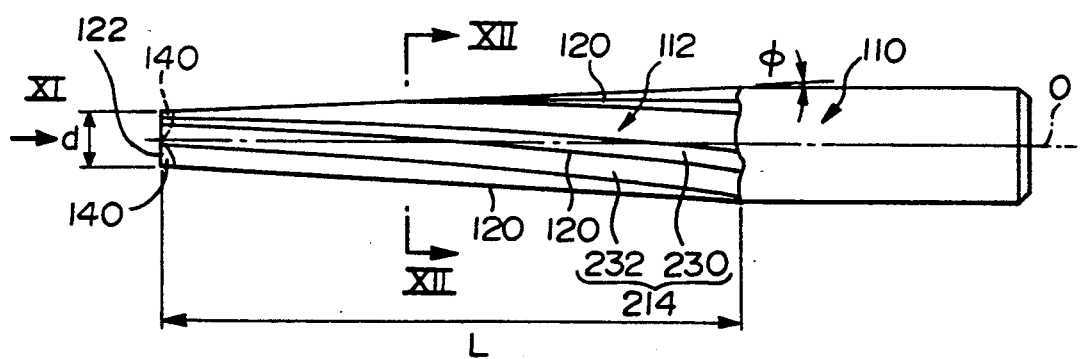
FIG. 10 is a plan view of an end mill in accordance with a second embodiment of the present invention.
Figure 11:
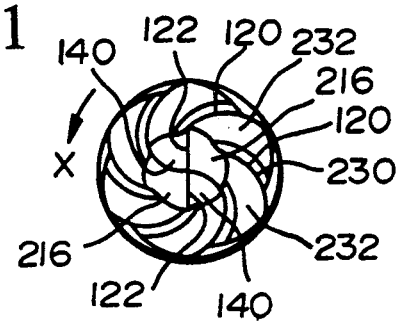
FIG. 11 is an end view of the end mill of FIG. 10 seen in the direction indicated by the arrow XI in FIG. 10.
Figure 12:
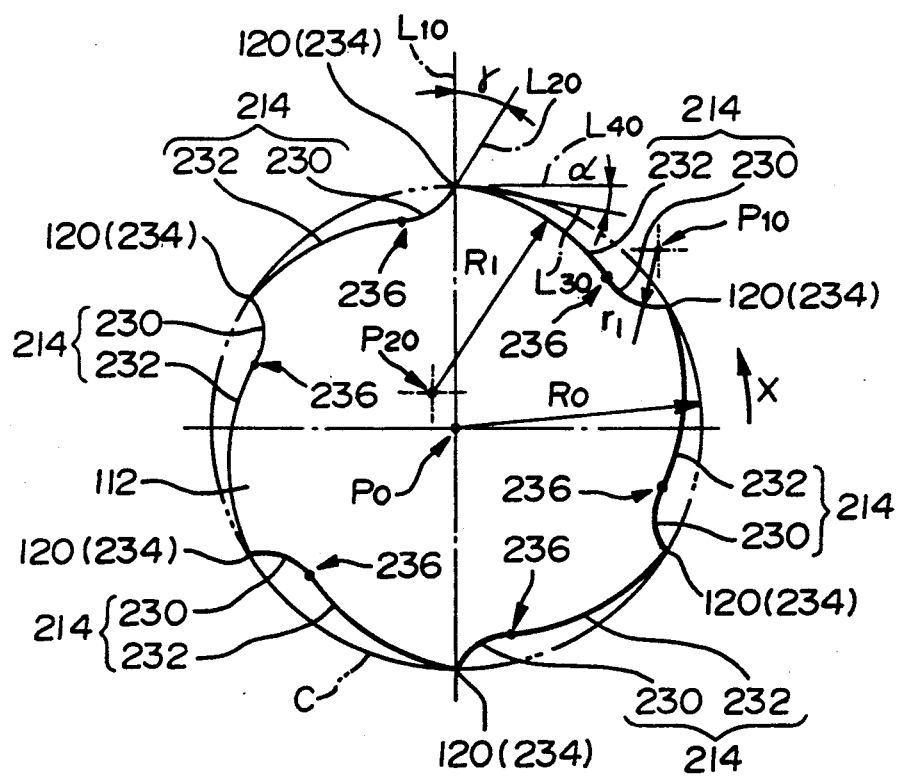
FIG. 12 is a cross-sectional view of the end mill of FIG. 10 taken along the line XII—XII in FIG. 10.

Shown in FIGS. 10 to 12 is a tapered end mill in accordance with a second embodiment of the present invention, in which the same parts as those of the first embodiment are designated by the same numerals to avoid unnecessary duplication of explanation.

As shown in FIGS. 10 to 12, the end mill of the second embodiment comprises a tool body 110 having a shaft-like shape, the tool body 110 having a cutting edge portion 112 formed at one end(front end) thereof. The cutting edge portion 112 has a tapered shape in the second embodiment, shown in FIG. 10, having the diameter thereof descreased toward the front end of the tool body 110. On the circumference of the cutting edge portion 112 are a plurality of spiral circumferential cutting edges 120 formed on the circumference thereof around the longitudinal axis "O" of the tool body 110 so that a phantom conical rotary locus "C" is formed around the axis "O" of the tool body. The cutting edge portion 112 further has end cutting edges 122 formed at the front end thereof. The configuration of the second embodiment is similar to the first embodiment in so far as the characteristics described above.

As shown in FIGS. 10 to 12, the circumferential surface 214 of the cutting edge portion 112 comprises concave surfaces 230 receding inwardly toward the centerline of the cutting edge portion 112, and convex surfaces 232 projecting outwardly radially of the cutting edge portion 112; each of the concave surfaces 230 and each of the convex surfaces 232 being alternately arranged with each other circumferentially in a cross section perpendicular to the axis of the tool body.

Each of the convex surfaces 232 descibed above has one end thereof meeting the rotary locus, or phantom conical surface "C" in the cross section perpendicular to the axis of the tool body. Each of the convex surfaces 232 is formed to have the convex line in the cross section gradually receding from the phantom conical surface "C" toward the center $P_0$ of the cross section of the cutting edge portion 112 along with the convex surface from the one end 234 coinciding with the phantom conical surface to the other end 236. The curvature ($1/R_1$) of the convex surface 232 is arranged to be larger than the curvature ($1/R_0$) of the phantom conical surface "C".

Each of the concave surfaces 230 is formed to have one end of the concave surface 230 smoothly connected with the other end 236 of the convex surface 232, and to have the other and of the concave surface 230 intersecting the one end 234 of the convex surface 232. The curvature ($1/r_1$) of the concave surface 230 is arranged to be larger than the curvature ($1/R_1$) of the convex surface 232 described above.

Those concave surfaces 230 and the convex surfaces 232 are respectively formed in a spiral surface gradually spiraled clockwise around the axis "0" of the tool body from the one end (front end) of the cutting edge portion 112 toward the other end (rear end) of the cutting edge portion 112, whereby the one end 234 of the convex surface 232 intersects with the concave surface 230 to form an intersecting ridge to be the circumferential cutting edge 120. Thus, when turning the tapered end mill in the direction of arrow X, the concave surface 230 and the convex surface 232 respectively become the rake face and the flank of the circumferential cutting edge 120, whereby an angle $\gamma$ between a line $L_{10}$ drawn through the center $P_0$ of the tool body and the circumferential cutting edge 120, and a tangent line $L_{20}$ to the concave surface 230 drawn through the circumferential cutting edge 120 forms the rake angle, and an angle $\alpha$ between a tangent line $L_{30}$ to the convex surface 232 drawn through the circumferential cutting edge 120, and a tangent line $L_{40}$ to the phantom conical surface "C" drawn through the circumferential cutting edge 120 forms the relief angle with respect to the circumferential cutting edge 120.

Furthermore, two grooves 140 are formed at the front end of the cutting edge portion 112 of the second embodiment, each of which is open to both the front end surface 116 and the circumferential surface 114 of the cutting edge portion 112, whereby an intersecting ridge, or the end cutting edge 122, is formed between the wall of each of the grooves 140 and the front end surface 116 respectively.

The axial length L and the taper angle $\phi$ of the cutting edge portion 112 may be determined in accordance with the configuration of a groove to be cut. The value of an axial length L is usually arranged to be at least six times the rotational diameter "d" at the front end of the circumferential cutting edge 120. The value of a taper angle $\phi$ of the cutting edge portion 112 is usually set at 5°.

Subsequently, a tapered end mill of the second embodiment formed in accordance with the above description has the circumferential surface 214 of the cutting edge portion 112 of the second embodiment formed by a combination of the concave surface 230 and the convex surface 232. Therefore, the configuration of the concave surface 230 and convex surface 232 may be changed so that the rake angle $\gamma$ and relief angle $\alpha$ is arranged to be appropriate for cutting requirements, without restriction by the number of edges of the circumferential cutting edges 120.

Thus, the rake angle $\gamma$ and relief angle $\alpha$ are determined by the directions of the tangent lines $L_{20}$ and $L_{30}$ to the concave surface 230 and the convex surface 232 respectively as described above, both the tangent lines $L_{20}$ and $L_{30}$ drawn through the circumferential cutting edge 120, where the directions of those tangent lines $L_{20}$ and $L_{30}$ vary in accordance with the value of the curvatures $(1/r_1)$ and $(1/R_1)$ and the positions $P_{10}$ and $P_{20}$ of the center of the curvatures. For example, when the curvature $(1/r_1)$ of the concave surface 230 is changed to a smaller curvature $(1/r_2)$ while maintaining the position of the circumferential cutting edge 120, the rake angle $\gamma_1$ is shifted toward the positive angle region and changed to a rake angle $\gamma_2$ as shown in the "A" region of FIG. 13.

Figure 13:
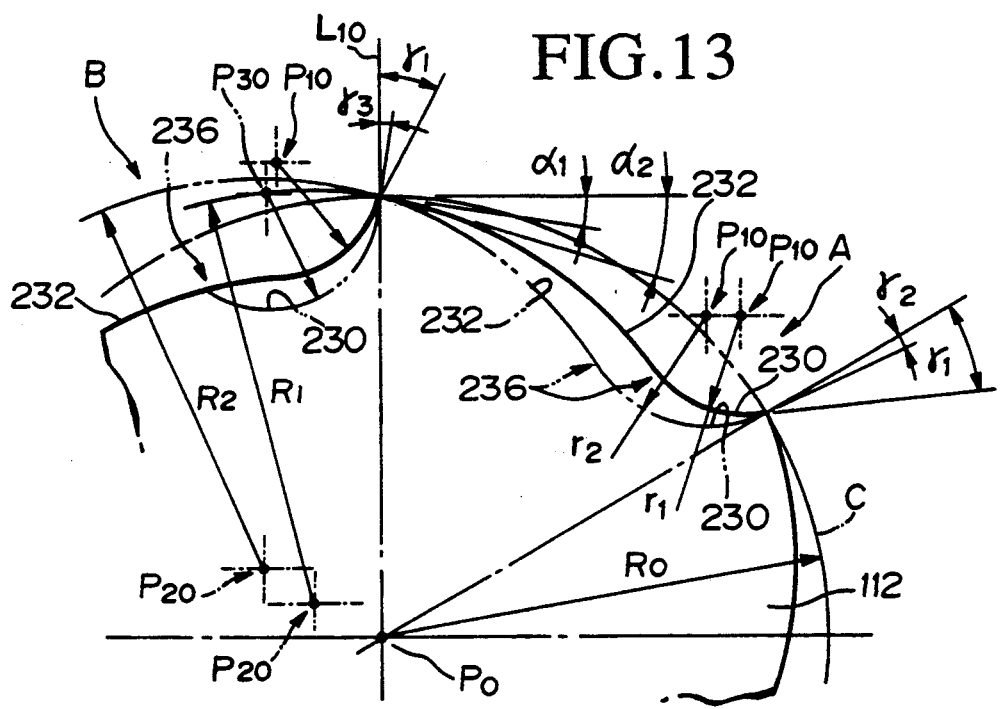
FIG. 13 is a cross sectional view of a variation of the end mill of FIG. 10.

As another example, when the curvature $(1/R_1)$ of the convex surface 232 is changed to a larger curvature $(1/R_2)$ while maintaining the position of the circumferential cutting edge 120, the relief angle $\alpha_1$ is changed to a larger relief angle $\alpha_2$ as shown in the same "A" region of FIG. 13.

Furthermore, when the curvature of concave surface 230 and convex surface 232 are not changed but the position $P_{10}$ of the center of the curvature of the concave 230 is moved to a position $P_{30}$ closer to the center of the axis of the tool body while maintaining the position of the circumferential cutting edge 120, the rake angle $\gamma_1$ is changed to a rake angle $\gamma_3$ closer to the positive angle region as shown in the "A" region of FIG. 13.

Thus, since the rake angle $\gamma$ of the circumferential cutting edge 120 of the second embodiment can be changed by appropriately varying the configuration of, for example, the curvature of the concave surface 230 without restriction by the number of the circumferential cutting edges 120, the rake angle $\gamma$ can be shifted toward the positive angle region compared with conventional end mills, thereby improving the cutting sharpness.

Also, since the relief angle $\alpha$ of the circumferential cutting edge 120 of the second embodiment can be adjusted by appropriately varying the configuration, such as the curvature of the convex surface 232, without restriction by the number of the circumferential cutting edges 120, the relief angle $\alpha$ may be adjusted to a smaller value if the rake angle $\gamma$ is shifted toward the positive angle region, thereby avoiding the decrease in the edge strength.

Figure 21:
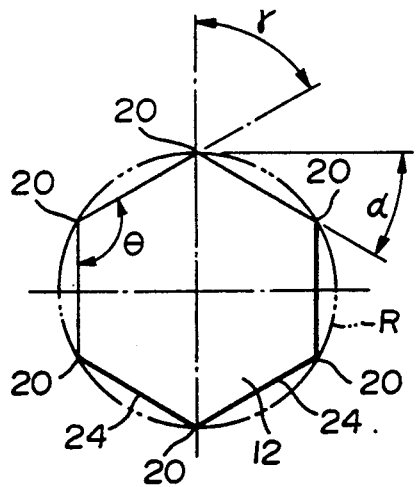
FIG. 21 is a cross-sectional view of the end mill of FIG. 19 taken along the line XXI—XXI in FIG. 19.
Figure 22:
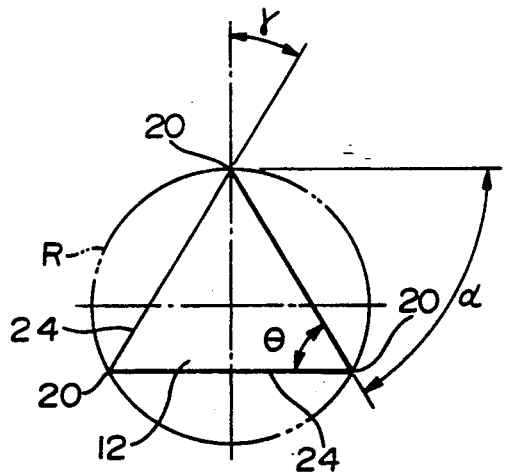
FIG. 22 is a cross sectional view of a variation of the end mill of FIG. 19.
Figure 23:
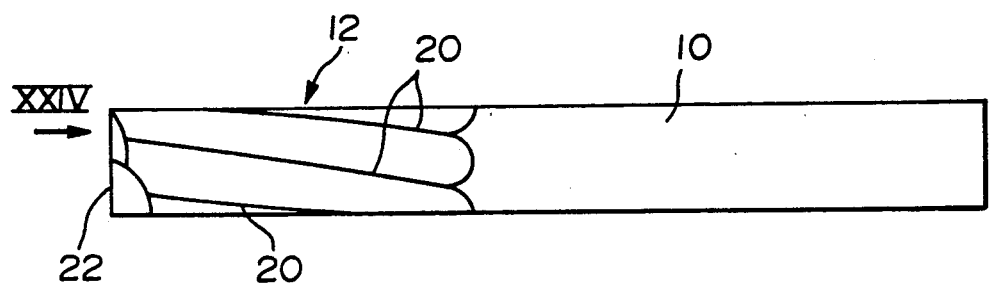
FIG. 23 is a plan view of another conventional end mill.
Figure 24:
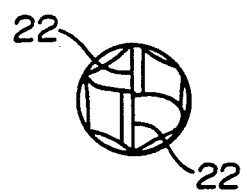
FIG. 24 is an end view of the end mill of FIG. 23 seen in the direction indicated by the arrow XXIV in FIG. 23.

Furthermore, since the cross sectional area of the cutting edge portion 112 of the second embodiment can be changed by varying the receding amount of the concave surface 230 and/or the convex surface 232 toward the center $P_o$ of the tool away from the phantom conical surface "C", a cross sectional area equal to or more than the cross sectional area of a conventional six-edge tapered end mill, which was described earlier with reference to FIG. 21, can be secured by appropriately determining the configuration of those concave and convex surfaces 230 and 232. Thus, with the second embodiment described above, the cutting sharpness can be improved while avoiding decrease in tool rigidity so that cutting efficiency can be improved.

In addition, since the rake angle $\gamma$ and the relief angle $\alpha$ of the second embodiment can be determined without restriction by the number of edges of the circumferential cutting edges 120 as in the first embodiment, the number of the circumferential cutting edges 120 may be increased from 6 to a larger number such as 8 or 10, for example, while maintaining the rake angle $\gamma$ and the relief angle $\alpha$ the same as those values of such angles for a six-edged case. In this case, distinctive advantage is secured in that the feed of the cutting tool can be increased for higher cutting efficiency.

Though the ranges for the configurations, such as the curvature of the concave and convex surfaces 230 and 232, has not been specifically given in the description of the second embodiment above, those configurations may be appropriately determined with respect to parameters such as the rake angle $\gamma$, the relief angle $\alpha$, and the tool diameter. The rake angle $\gamma$ of the second embodiment, however, may be advantageously arranged between a range of 0° to −45° because if the rake angle $\gamma$ exceeds 0°, the tool rigidity would tend to decrease due to an insufficient included angle $\theta$ of the circumferential cutting edges 120, and because if the rake angle $\gamma$ is below −45°, the cutting sharpness would tend to decrease due to an excessive increase in the cutting resistance to the circumferential cutting edges 120. The rake angle $\gamma$ is taken to be of a positive value if the line $L_{10}$ coincides with the line $L_{20}$ when the line $L_{10}$ is turned counterclockwise (however, $-90° < \gamma < 90°$).

Also, the relief angle $\alpha$ of the second embodiment may be advantageously arranged between a range of 5° to 20° because if the relief angle $\alpha$ is less than 5°, the circumferential cutting edges 120 would tend to wear out prematurely, and because if the relief angle $\alpha$ is more than 20°, the tool rigidity would tend to decrease due to an insufficient included angle $\theta$ of the circumferential cutting edges 120.

Although one end of the concave surface 230 of the second embodiment is described to be smoothly connected with the other end 236 of the convex surface 232 in the description above, the present invention is not limited to such description. For example, the one end of the concave surface 230 may be arranged to be intersecting at an angle with the other end 236 of the convex surface 232, as shown in the "B" region of FIG. 13.

Figure 14:
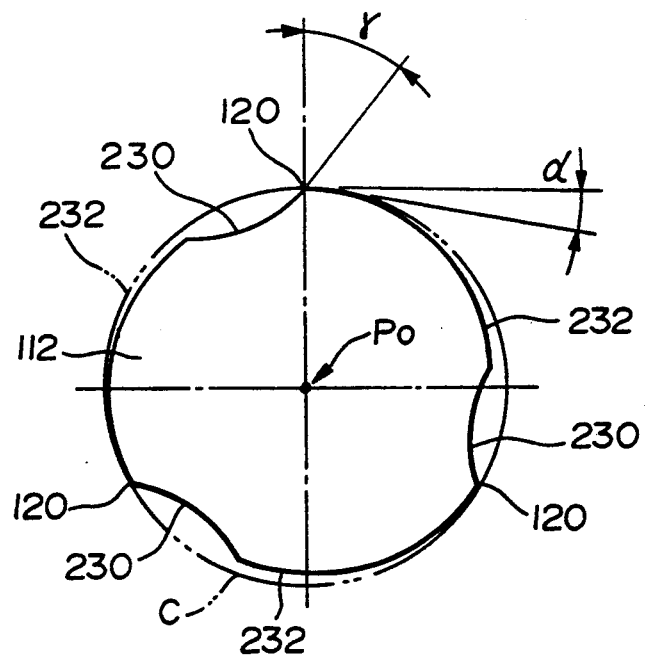
FIG. 14 is a cross sectional view of a variation of the end mill of FIG. 10.
Figure 15:
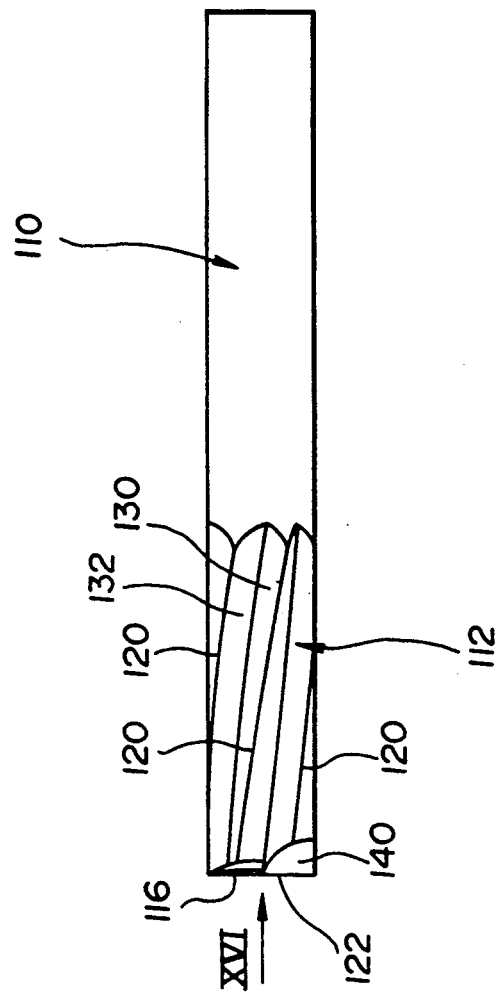
FIG. 15 is a plan view of an end mill in accordance with a further embodiment of the present invention.
Figure 16:
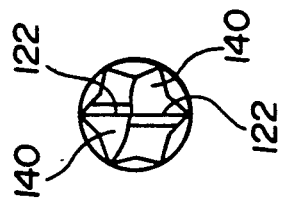
FIG. 16 is an end view of the end mill of FIG. 15 seen in the direction indicated by the arrow XVI in FIG. 15.
Figure 17:
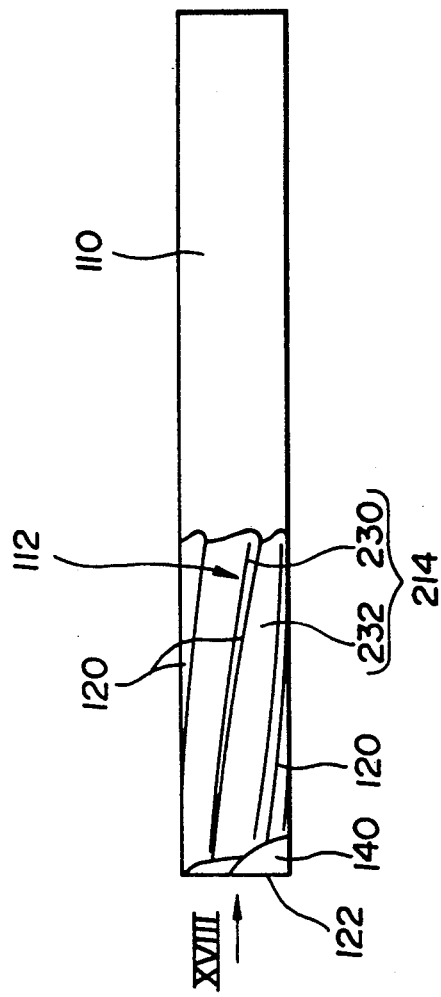
FIG. 17 is a plan view of an end mill in accordance with a still further embodiment of the present invention.
Figure 18:
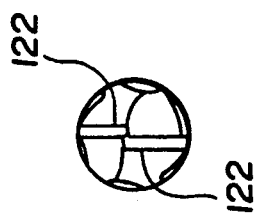
FIG. 18 is an end view of the end mill of FIG. 17 seen in the direction indicated by the arrow XVIII in FIG. 17.
Figure 20:
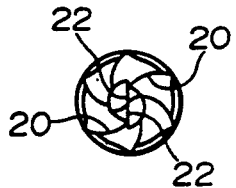
FIG. 20 is an end view of the end mill of FIG. 19 seen in the direction indicated by the arrow XX in FIG. 19.
Figure 19:
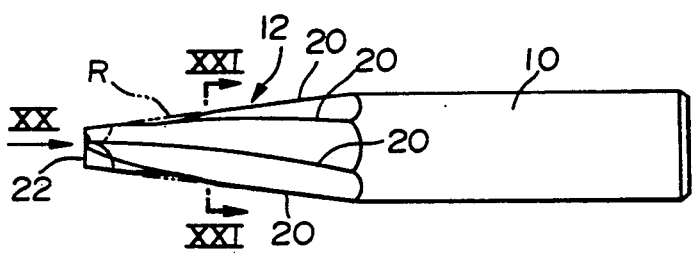
FIG. 19 is a plan view of a conventional end mill.

The first and second embodiments of the present invention and variations thereof have been described above with regard to a tapered end mill where the circumferential cutting edges 120 form a rotary locus of truncated conical shape around the axis of the tool body, the diameter of the truncated conical shape decreasing toward the front end of the cutting edge portion 112. It is understood, however, that the present invention also applies to a straight end mill where the circumferential cutting edges 120 form a rotary locus of a right cylindrical column shape around the axis of the tool body as shown in FIGS. 15 to 18, resulting in similar effects. Such effects which are similar to those obtained from tapered end mills as described above are obtained in the case of a straight end mill by forming the cross section perpendicular to the axis of the cutting tool shown in FIGS. 15 and 16 in the same configuration as the cross sections shown in FIGS. 3 to 9 for the first embodiment, and by forming the cross section perpendicular to the axis of the cutting tool shown in FIGS. 17 and 18 in the same configuration as the cross sections shown in FIGS. 12 to 14 for the second embodiment. A straight end mill with the above arrangement in accordance with the present invention may be advantageously used for cutting a work of high hardness.

It should also be understood that the present invention is not to be limited to end mills for cutting deep grooves described above as embodiments, but can be advantageously employed to any and all other end mills, in which rigidity and cutting accuracy are required. Those skilled in the art will appreciate that various modifications and variations of the present invention may be made without departing from the spirit and scope of the present invention as claimed in the claims.

What is claimed is:

1. An end mill comprising a tool body having a shaft-like shape, said tool body having a cutting edge portion formed on one end thereof, said cutting edge portion having an end cutting edge formed at a front end of said one end of said tool body, said cutting edge portion having a plurality of circumferential cutting edges formed on the circumference thereof along a longitudinal axis of said tool body, said cutting edge portion having a circumferential surface thereof comprising rake faces and flanks, each of said rake faces adjoining one of two adjacent circumferential cutting edges, each of said flanks intersecting one of said rake faces at one end and adjoining the other of said two adjacent circumferential cutting edges at the other end, said rake faces having a rake angle arranged between a range of −45° to 5° at a cross section perpendicular to said axis of said tool body, said flanks having a relief angle arranged between a range of 20° to 45° at a cross section perpendicular to said axis of said tool body, said circumferential cutting edges directly adjoining the flanks.

2. An end mill according to claim 1, wherein said circumferential cutting edges form a rotary locus of truncated conical shape around said axis of said tool body, said truncated conical shape having the diameter thereof decreased toward said cutting edge portion end of said tool body.

3. An end mill according to claim 1, wherein said circumferential cutting edges form a rotary locus of right cylindrical column shape around said axis of said tool body.

4. An end mill comprising a tool body having a shaft-like shape, said tool body having a cutting edge portion formed on one end thereof, said cutting edge portion having an end cutting edge formed at a front end of said one end of said tool body, said cutting edge portion having a plurality of circumferential cutting edges formed on the circumference thereof along a longitudinal axis of said tool body, said cutting edge portion having a circumferential surface thereof comprising rake faces and flanks, each of said rake faces adjoining one of two adjacent circumferential cutting edges, each of said flanks intersecting one of said rake faces at one end and adjoining the other of said two adjacent circumferential cutting edges at the other end, said rake faces having a rake angle arranged between a range of −45° to 5° at a cross section perpendicular to said axis of said tool body, said flanks having a relief angle arranged between a range of 20° to 45° at a cross section perpendicular to said axis of said tool body, said circumferential cutting edges has an edge reinforcing surface formed at each of intersecting portions of said circumferential cutting edges and said flanks, said edge reinforcing surface having a relief angle smaller than said relief angle of said flanks.

5. An end mill according to claim 4, wherein each of said edge reinforcing surface is formed into a convex form conforming to said rotary locus formed by said circumferential cutting edges around said axis of said tool body.

6. An end mill according to claim 4, wherein said circumferential cutting edges form a rotary locus of truncated conical shape around said axis of said tool body, said truncated conical shape having the diameter thereof decreased toward said cutting edge portion end of said tool body.

7. An end mill according to claim 4, wherein said circumferential cutting edges form a rotary locus of right cylindrical column shape around said axis of said tool body.

8. An end mill comprising a tool body having a shaft-like shape, said tool body having a cutting edge portion formed on one end thereof, said cutting edge portion having an end cutting edge formed at a front end of said one end of said tool body, said cutting edge portion forming a rotary circle of a rotary locus thereof and having a plurality of circumferential cutting edges formed on the circumference thereof along a longitudinal axis of said tool body, a cross-section perpendicular to the longitudinal axis of the cutting edge portion being of constant shape along the longitudinal axis, said cutting edge portion having the circumferential surface thereof comprising concave surfaces receding inwardly toward the longitudinal axis of said tool body and convex surfaces projecting outwardly radially of said cutting edge portion, each of said concave surfaces and each of said convex surfaces being alternately arranged with each other circumferentially on a cross section perpendicular to said axis of said tool body, each of said convex surfaces having one end thereof meeting the rotary circle of said rotary locus on said cross section perpendicular to said axis of said tool body, said rotary locus formed by said circumferential cutting edges, said each of said convex surfaces having a curvature gradually growing larger from said one end toward the other end of said convex surface, each of said convex surfaces receding toward a centerline of said cutting edge portion, whereby said one end of each of said convex surfaces intersecting one adjacent concave surface of said concave surfaces forms said circumferential cutting edge, each of said concave surfaces forming a rake face, each of said convex surfaces forming a flank.

9. An end mill according to claim 8, wherein said circumferential cutting edges form a rotary locus of truncated conical shape around said axis of said tool body, said truncated conical shape having the diameter thereof decreased toward said cutting edge portion end of said tool body.

10. An end mill according to claim 8, wherein said circumferential cutting edges form a rotary locus of right cylindrical column shape around said axis of said tool body.

* * * * *